United States Patent
Satou et al.

(10) Patent No.: US 7,567,300 B2
(45) Date of Patent: Jul. 28, 2009

(54) VIDEO SIGNAL PROCESSOR

(75) Inventors: Takayuki Satou, Tokyo (JP); Hidetsugu Takahashi, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 686 days.

(21) Appl. No.: 11/350,844

(22) Filed: Feb. 10, 2006

(65) Prior Publication Data

US 2006/0187357 A1 Aug. 24, 2006

(30) Foreign Application Priority Data

Feb. 24, 2005 (JP) ............................. 2005-048303

(51) Int. Cl.
H04N 9/64 (2006.01)

(52) U.S. Cl. ..................................... 348/609

(58) Field of Classification Search ................ 348/607, 348/609, 611, 614, 618, 619, 622, 666
See application file for complete search history.

(56) References Cited

U.S. PATENT DOCUMENTS 5,019,895 A * 5/1991 Yamamoto et al. .......... 348/609
5,027,194 A * 6/1991 Scheffler .................... 348/609
5,448,305 A * 9/1995 Hagino ...................... 348/665
7,271,850 B2 * 9/2007 Chao ......................... 348/609
7,280,159 B2 * 10/2007 Chao ......................... 348/609
2005/0030381 A1 * 2/2005 Tanigawa ................... 348/155
2005/0168650 A1 * 8/2005 Walls et al. ................ 348/666

FOREIGN PATENT DOCUMENTS

JP 2004-128936 4/2004

* cited by examiner

*Primary Examiner*—Paulos M Natnael
(74) *Attorney, Agent, or Firm*—Studebaker & Brackett PC; Donald R. Studebaker

(57) ABSTRACT

A video signal processor recursively removes noise from luminance signal data, storing only one frame of the luminance signal data, and detects luminance motion by comparing the current and stored luminance data to decide whether to output the current color difference data, the average of the current color difference data and the color difference data one frame before, or the average of the current color difference data and the color difference data two frames before. The decision may also involve detection of color noise by comparison of the color difference data with the data one frame before, or detection of color motion by comparison of the color difference data with data two or four frames before. Color data stored for color noise detection may also be used for recursive color noise removal. Accurate noise reduction is possible with a comparatively small amount of memory.

20 Claims, 5 Drawing Sheets

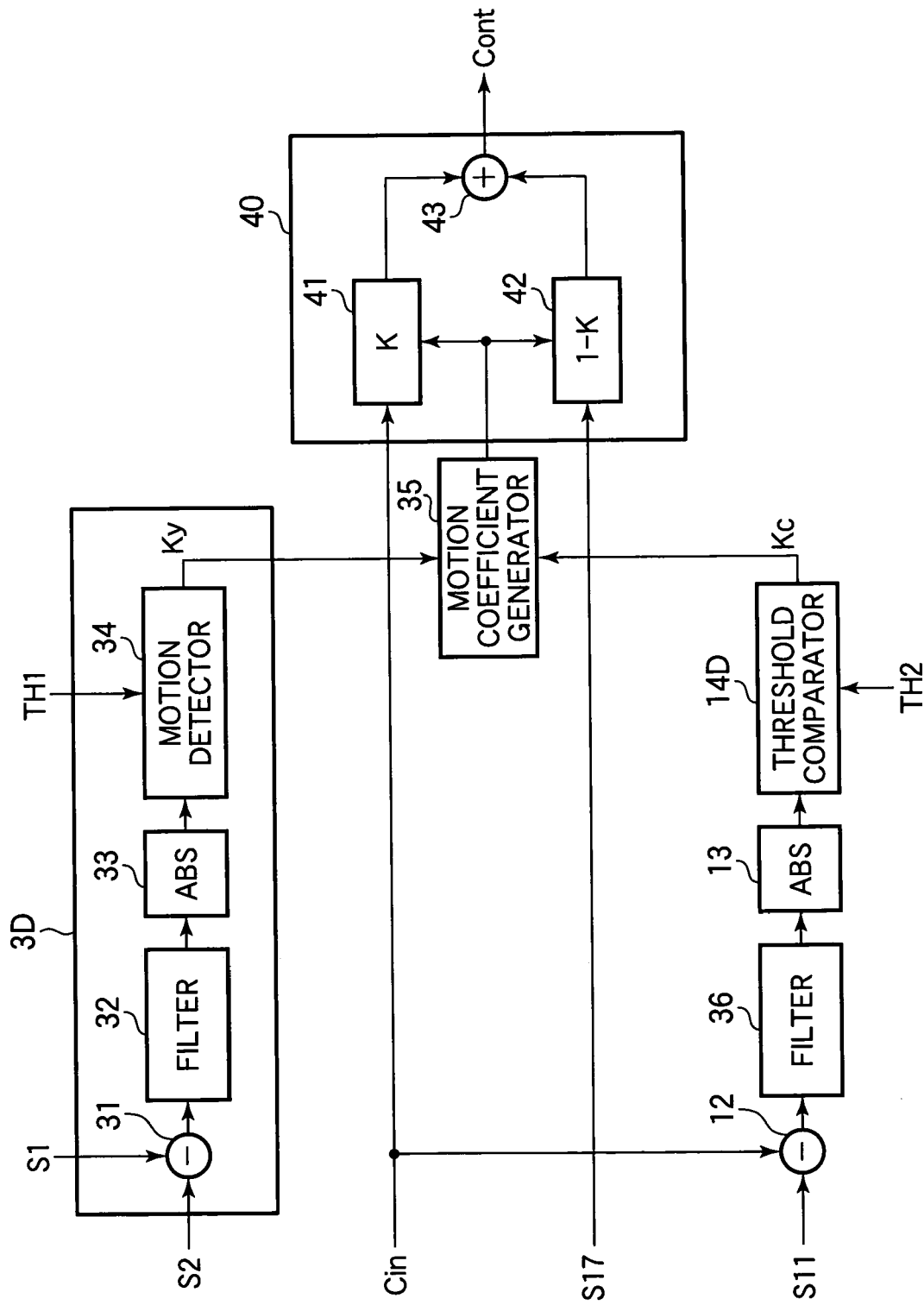

VIDEO SIGNAL PROCESSOR

BACKGROUND OF THE INVENTION

1. Field of the Invention

The present invention relates to a video signal processor that accurately removes cross-color noise, or cross-color noise and random noise, from the demodulated color difference components of a video signal of the National Television System Committee (NTSC) or Phase Alternation by Line (PAL) type in a video device such as a video display device or a video recording and reproducing device, avoiding color smear due to motion.

2. Description of the Related Art

Prior art relating to this type of video signal processing is disclosed in, for example, Japanese Patent Application Publication No. 2004-128936. FIG. 1 of that Publication shows a video signal processor that examines pixels at the same positions in two consecutive frames and detects motion from the frame-to-frame differences of the luminance values of the pixels. If no motion is detected, cross-color noise (crosstalk from the luminance component into the color components) is detected from frame-to-frame differences in the color difference signals, and if cross-color noise is present, it is removed by averaging the color difference signals of the current frame and a previous frame.

This method relies on the formulas listed in Table 1, which hold when the color difference component signals demodulated from an NTSC or a PAL television video signal do not vary over time, regardless of the presence or absence of cross-color noise.

TABLE 1

| Cross-color in Color Difference Signals | | |
|---|---|---|
| | NTSC | PAL |
| Current input color difference signal | C'(n) = C(n) + ycc(n) | C'(n) = C(n) + ycc(n) |
| 180° phase-offset color difference signal | C'(n − 1) = C(n − 1) − ycc(n − 1) | C'(n − 2) = C(n − 2) − ycc(n − 2) |

In this table, n represents the current frame, n−1 represents the immediately preceding frame, n−2 represents the second preceding frame, C represents the true color difference component, ycc represents a luminance component that crosses into the color difference component during luminance/chrominance (Y/C) separation (cross-color noise), and C' represents the separated color difference signal.

When the input video data form a still picture, the following formulas hold for NTSC and PAL television signals.

NTSC $$C(n)=C(n-1) \quad (1)$$

$$ycc(n)=ycc(n-1) \quad (2)$$

PAL $$C(n)=C(n-2) \quad (3)$$

$$ycc(n)=ycc(n-2) \quad (4)$$

Accordingly, the result of averaging the current color difference signal C'(n) and the immediately preceding color difference signal C'(n−1) for NTSC, and averaging the current color difference signal C'(n) and the second preceding color difference signal C'(n−2) for PAL, is the true color difference component C(n), the cross-color component ycc being eliminated. This averaging process is independent of the value of ycc and also works when ycc=0; when there is no temporal variation (no motion), the averaged value is equal to the desired color difference signal C(n) regardless of the presence or absence of cross-color.

A problem with the method disclosed in the above Patent Application Publication is that no motion is assumed to be present whenever there is no detectable luminance motion between two frames, even if motion is present in the color components. This can occur (a) if the only frame-to-frame change in the luminance signal occurs at high frequencies near the chrominance subcarrier frequency (fsc), which are removed from the luminance signal (and become a moving cross-color component) during Y/C separation, or (b) if the luminance signal remains substantially unchanged at all frequencies, but the color difference signals change from one frame to the next. If the averaging process is selected when color motion is present, unwanted color effects such as color smearing may appear.

A further problem is that in the PAL format, which has a four-frame color difference cycle in which the phase reverses once every two frames, the two frames that are averaged are separated by a two-frame interval, so to detect motion accurately, the luminance signal must be retained for the same two-frame interval; that is, a two-frame luminance signal memory is required instead of a one-frame memory.

Another problem is that although removal of cross-color noise by the averaging method also has some effect in reducing random noise, the effect is only a halving effect (−6 dB), so half the random noise tends to remain.

A more effective random noise reduction method that operates recursively is known, although it is not mentioned in the above Patent Application Publication. Recursive noise reduction to remove random noise could be applied separately from the averaging process that removes cross-color noise, but then two frame memories would be required.

SUMMARY OF THE INVENTION

An object of the present invention is to remove cross-color noise accurately from both NTSC and PAL video data without the need to store more than one frame of luminance data.

Another object of the invention is to remove cross-color noise from both NTSC and PAL video data without the need to store more than two frames of color difference data.

Another object is to avoid color smear by detecting color motion even when luminance motion cannot be detected.

Another object is to remove random noise from the color difference data by frame recursive noise reduction without the need for extra color difference data memory.

The invented video signal processor receives luminance input signal data and color difference input signal data as consecutive frames of video data. In the processor, a frame recursive luminance noise reducer preferably removes noise from the luminance input signal data to obtain luminance output signal data. A first video data memory stores the luminance output signal data for one frame interval, and outputs the stored data as first delayed data. The frame recursive luminance noise reducer, if present, makes use of the first delayed data. A luminance motion detector compares the luminance output signal data with the first delayed data and generates a luminance motion signal: either a detection signal indicating whether luminance motion is present, or a coefficient indicating the degree of luminance motion present. The color difference input signal data are stored and delayed for at least one frame, and an average of the color difference input signal data and the delayed color difference data is taken to obtain averaged color difference data. The color difference input signal data and the averaged color difference data are then combined in a ratio that depends on at least the luminance motion signal to obtain color difference output signal data. If the luminance motion signal is a detection signal, either the color difference input signal data or the averaged color difference data is selected as the color difference output signal data.

According to a first aspect of the invention, the color difference input signal data are delayed by one frame (NTSC) or two frames (PAL) to generate second delayed data, and the second delayed data are delayed by a like amount to generate third delayed data. The averaged color difference data are the average of the color difference input signal data and the second delayed data. Color motion is detected by comparing the color difference input signal data with the third delayed data, and the result is output as a zero-phase motion signal: either a detection signal indicating the presence or absence of color motion, or a coefficient indicating the degree of color motion present. The color difference input signal data and the averaged color difference data are combined according to both the luminance motion signal and the color motion signal.

Even when luminance motion is not detected, color motion is detected accurately by comparing two signals with identical luminance-chrominance phase relationships. Color smear due to color averaging when color motion is present can therefore be avoided.

According to a second aspect of the invention, the color difference input signal data are delayed by one frame to generate second delayed data, either the color difference input signal data or the second delayed data are selected according to the luminance motion signal, and the selected data are delayed by one frame to generate third delayed data, which are averaged with the color difference input signal data to obtain the averaged color difference data.

When the luminance motion signal is a detection signal, for example, the average of the current color difference input signal data and the color difference input signal data two frames before is output if no luminance motion is detected over either of the last two one-frame intervals. The average of the current color difference input signal data and the color difference input signal data one frame before is output if no luminance motion is detected over the last one-frame interval but luminance motion was present in the one-frame interval preceding that. The current color difference input signal data is output if motion is detected in the last one-frame interval. A generally similar ratio scheme is used when the luminance motion signal is a coefficient signal. These schemes work in particular for PAL video data, enabling PAL video data to be processed with no more memory than required for NTSC video data.

According to a third aspect of the invention, a frame recursive color difference noise reducer removes noise from the color difference input signal data to obtain noise-reduced color difference signal data. Either the color difference input signal data or the noise-reduced color difference signal data are selected according to a color difference noise reduction decision signal, and the selected data are delayed by one frame to generated second delayed data. The second delayed data are compared with the color difference input signal data to generate the color difference noise reduction decision signal, and are averaged with the color difference input signal data to obtain the averaged color difference data. The color difference input signal data and the averaged color difference data are combined according to both the luminance motion signal and the color difference noise reduction decision signal.

The third aspect of the invention uses the same frame memory for both frame recursive color difference noise reduction and cross-color noise reduction. When large frame-to-frame changes in the color difference data are present despite a lack of significant luminance motion, indicating that the color difference data include cross-color noise, the cross-color noise is removed by averaging. Otherwise, random noise is removed from the color difference data by the recursive color difference noise reducer.

In all three aspects of the invention, the frame recursive luminance noise reducer may be disabled when there is little or no noise in the luminance input signal data, in which case the luminance output signal data are identical to the luminance input signal data.

All three aspects of the invention require storage of the luminance input signal data for only one frame, even when the input video data are PAL video data.

BRIEF DESCRIPTION OF THE DRAWINGS

In the attached drawings:

FIG. 5 is a block diagram of a video signal processor according to a fifth embodiment of the invention.

DETAILED DESCRIPTION OF THE INVENTION

Figure 1:
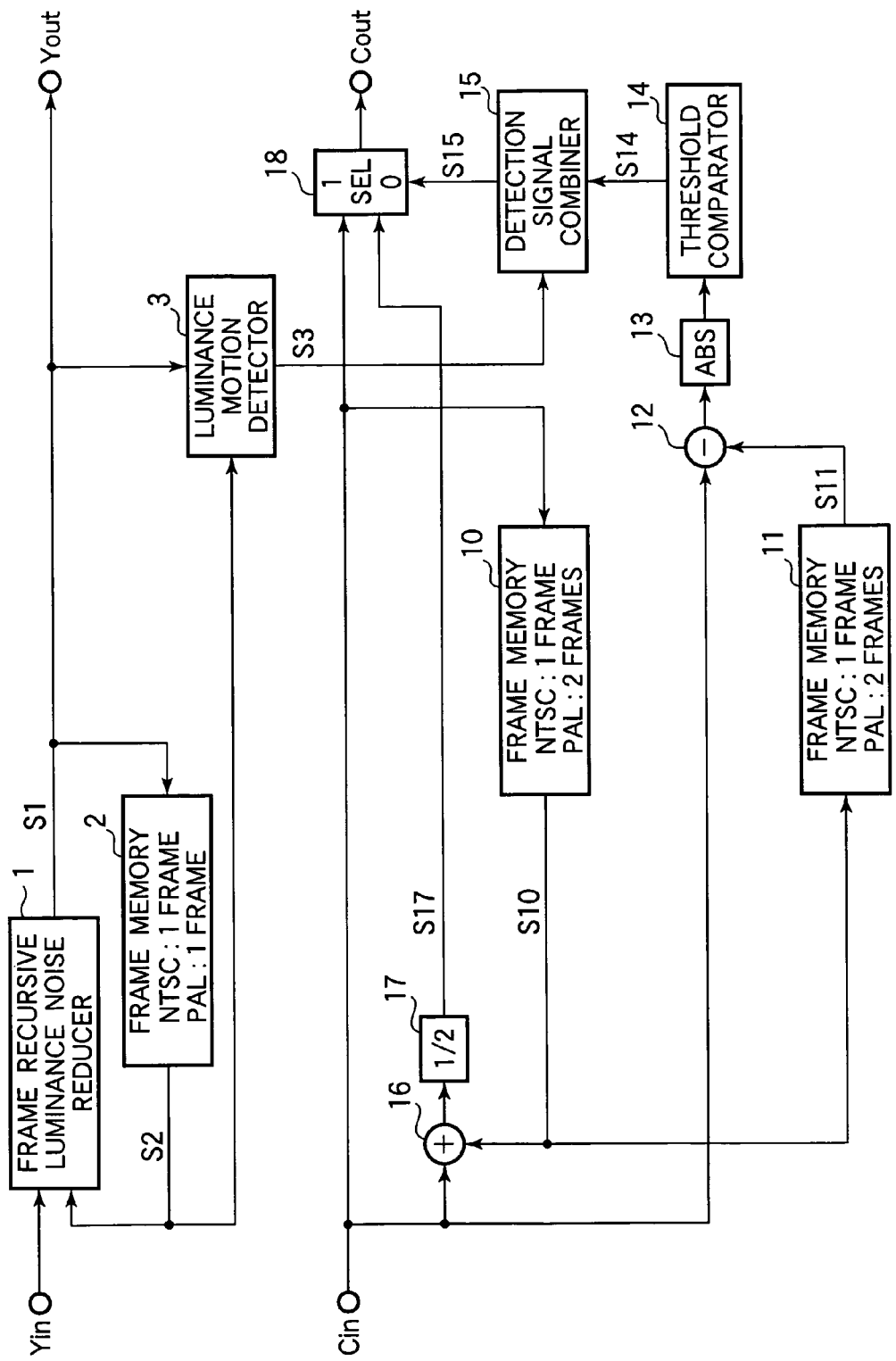
FIG. 1 is a block diagram of a video signal processor according to a first embodiment of the invention.

Embodiments of the invention will now be described with reference to the attached drawings, in which like elements are indicated by like reference characters.

FIRST EMBODIMENT

Referring to FIG. 1, the video signal processor receives luminance input signal data Yin and color difference input signal data Cin as digital input video signals. A luminance signal noise rejection section removes noise from the luminance input signal data Yin and outputs a noise-free luminance output signal data Yout. A cross-color rejection section removes cross-color noise from the color difference input signal data Cin and outputs a color difference signal Cout that is free of rainbow patterns and other unwanted cross-color effects.

The luminance signal noise rejection section includes a frame recursive luminance noise reducer 1, a first video data memory (in this embodiment, a frame memory 2) connected between the output and input of the frame recursive luminance noise reducer 1, and a luminance motion detector 3 connected to the output terminal of the frame memory 2.

The frame recursive luminance noise reducer 1 removes noise in accordance with the algebraic difference between the luminance input signal data Yin and first delayed data (in this embodiment, one-frame-delayed luminance signal data S2) and generates luminance output signal data S1 that form the luminance output (Yout) of the video signal processor. The internal structure (not shown) of the frame recursive luminance noise reducer 1 includes subtractors, a filter, an absolute value circuit, and a threshold comparator.

The frame memory 2 stores the noise-free luminance output signal data Yout for one frame interval and outputs the one-frame-delayed luminance signal data S2 used by the frame recursive luminance noise reducer 1 to generate the luminance output signal data S1. The luminance motion detector 3 outputs a luminance motion signal S3 based on the difference between the noise-free luminance output signal data S1 and the one-frame-delayed luminance signal data S2.

The cross-color rejection section includes a second video data memory (in this embodiment, a frame memory 10), a third video data memory (in this embodiment, a frame memory 11) connected to the output terminal of the second frame memory 10, and a zero-phase comparison motion detector connected to the output terminal of frame memory 11. The zero-phase comparison motion detector in this embodiment includes a subtractor 12, an absolute value circuit (ABS) 13, and a threshold comparator 14. The cross-color rejection section further includes a detection signal combiner 15 connected to the output terminal of the threshold comparator 14, an averager, and an output unit. The averager in this embodiment includes an adder 16 and a divide-by-two circuit 17. The output unit is a selector (SEL) 18.

Frame memory 10 stores the input color difference input signal data Cin and outputs second delayed data (in this embodiment, 180° phase-offset color difference signal data S10). Frame memory 11 stores the 180° phase-offset color difference signal data S10 and outputs third delayed data (in this embodiment, 0° phase-offset color difference signal data S11). In the zero-phase comparison motion detector, the subtractor 12 takes the difference between the color difference input signal data Cin and the 0° phase-offset color difference signal data S11; the absolute value circuit 13 obtains the absolute value of the difference; the threshold comparator 14 detects color motion from the absolute value and outputs a color difference motion signal S14.

The detection signal combiner 15 combines the luminance motion signal S3 generated by the luminance motion detector 3 and the color difference motion signal S14 generated by the threshold comparator 14 and outputs a combined motion detection signal S15 to the selector 18. In the averager, the adder 16 adds the color difference input signal data Cin and the 180° phase-offset color difference signal data S10; the divide-by-two circuit 17 halves the sum and outputs averaged color difference signal data S17; the detection signal combiner 15 selects either the color difference input signal data Cin or the averaged color difference signal data S17 in accordance with the combined motion detection signal S15, and outputs the selected signal as a color difference signal Cout that is free of cross-color effects.

The operation of the first embodiment will be described next.

The frame recursive luminance noise reducer 1 in the luminance signal noise rejection section takes the algebraic difference between the luminance input signal data Yin and the one-frame-delayed luminance signal data S2 output from the frame memory 2. When the filtered absolute value of the algebraic difference is smaller than a threshold, the algebraic difference is treated as noise. When the filtered absolute value is greater than the threshold, the difference is treated as motion. When treated as noise, the algebraic difference is subtracted from the luminance input signal data Yin, and the result is output as the luminance output signal data S1 forming the luminance output (Yout) of the video signal processor. When the algebraic difference is treated as motion, the luminance input signal data Yin are output without alteration as the luminance output signal data S1 (Yout).

The frame memory 2 stores the luminance output signal data S1 for one frame and outputs the one-frame-delayed luminance signal data S2. The luminance motion detector 3 takes the absolute difference between the luminance output signal data S1 output from the frame recursive luminance noise reducer 1 and the one-frame-delayed luminance signal data S2 output from the frame memory 2. If the absolute value is greater than a certain threshold determined in consideration of noise and jitter, the luminance motion detector 3 sets the luminance motion signal S3 to a value indicating that motion is present. Otherwise, the luminance motion detector 3 sets the luminance motion signal S3 to a value indicating that motion is absent.

Frame memory 10 in the cross-color rejection section stores the color difference input signal data Cin for one frame for NTSC or two frames for PAL and outputs the resulting 180° phase-offset color difference signal data S10. Frame memory 11 stores the 180° phase-offset color difference signal data S10 for one frame for NTSC or two frames for PAL and outputs the resulting 0° phase-offset color difference signal data S11.

The 0° phase relationship relies on the formulas listed in Table 2, which hold when the color difference component signals demodulated from an NTSC or a PAL television video signal do not vary over time, regardless of the presence or absence of cross-color noise.

TABLE 2

Cross-color in Color Difference Signals

|  | NTSC | PAL |
|---|---|---|
| Current input color difference signal | C'(n) = C(n) + ycc(n) | C'(n) = C(n) + ycc(n) |
| 180° phase-offset color difference signal | C'(n − 1) = C(n − 1) − ycc(n − 1) | C'(n − 2) = C(n − 2) − ycc(n − 2) |
| 0° phase-offset color difference signal | C'(n − 2) = C(n − 2) + ycc(n − 2) | C'(n − 4) = C(n − 4) + ycc(n − 4) |

In this table, n represents the current frame, n−1 represents the immediately preceding frame, n−2 represents the second preceding frame, n−4 represents the fourth preceding frame, and ycc represents a luminance component that crosses into the color difference component during luminance/chrominance (Y/C) separation (cross-color noise). When the input video data form a still picture, the following formulas hold for NTSC and PAL television signals.

NTSC $$C'(n) \approx C(n-1) \approx C(n-2) \tag{5}$$

$$ycc(n) \approx ycc(n-1) \approx ycc(n-2) \tag{6}$$

$$C'(n) = C'(n-2) \tag{7}$$

PAL $$C'(n) \approx C(n-2) \approx C(n-4) \tag{8}$$

$$ycc(n) \approx ycc(n-2) \approx ycc(n-4) \tag{9}$$

$$C'(n) = C'(n-4) \tag{10}$$

Accordingly, averaging the current color difference signal C'(n) and the immediately preceding color difference signal C'(n−1) for NTSC and averaging the current color difference signal C'(n) and the second preceding color difference signal C'(n−2) for PAL eliminates the cross-color component ycc from the color difference input signal data Cin and yields an averaged color difference equal to the true color difference signal C(n).

When there is a scene change, for example, in the input video signal, if the luminance level remains substantially unchanged, the luminance motion detector may indicate that no motion is present, but if the color difference signal changes, so that formulas (7) and (10) do not hold, the change will be detected by the zero-phase comparison motion detector. Specifically, the subtractor 12 takes the difference between the color difference input signal data Cin and the 0° phase-offset color difference signal data S11 output from frame memory 11 to obtain the change in the color difference signal, the unchanged cross-color component (ycc) canceling out; the absolute value circuit 13 obtains the absolute value of the difference; if the absolute value is greater than the threshold level determined in consideration of noise and jitter, the threshold comparator 14 detects motion and sets the color difference motion signal S14 to indicate that motion is present. If the color difference signal also remains substantially unchanged and the absolute value is less than the threshold, the threshold comparator 14 sets the color difference motion signal S14 to indicate that motion is absent.

The detection signal combiner 15 combines the luminance motion signal S3 output from the luminance motion detector 3 and the color difference motion signal S14 output from the threshold comparator 14. When both the luminance motion signal S3 and the color difference motion signal S14 indicate that there is no motion, the combined motion detection signal S15 is given a value that causes the selector 18 to select the averaged color difference signal data S17. If either the luminance motion signal S3 or the color difference motion signal S14 indicates that there is motion, the combined motion detection signal S15 is given a value that causes the selector 18 to select the color difference input signal data Cin. The selected data are output as the color difference output signal data Cout. This makes it possible to avoid the color smear that sometimes occurred in the prior art when color motion was present.

According to the first embodiment, the cross-color noise rejection section detects color motion by making a zero-phase comparison (a comparison between color difference data with a 0° phase offset), using frame memories 10 and 11 to obtain a delayed signal in which both the color difference component and the cross-color component are in phase with the input signal. If motion is present in a high-frequency portion of the luminance signal that becomes cross-color noise during Y/C separation, it will accordingly be detected as a change in the cross-color (ycc) component in the cross-color noise rejection section, even if no luminance motion is detected in the luminance noise removing section because the low-frequency components of the luminance signal remain substantially unchanged. If color motion is present it will also be detected in the cross-color noise rejection section, even if no luminance motion is present at any frequency and the cross-color component remains unchanged. Consequently, color difference averaging in the presence of motion, which leads to color smear, can be avoided regardless of the signal (luminance or color difference) in which the motion occurs, and regardless of the frequency band in which the motion occurs.

SECOND EMBODIMENT

Figure 2:
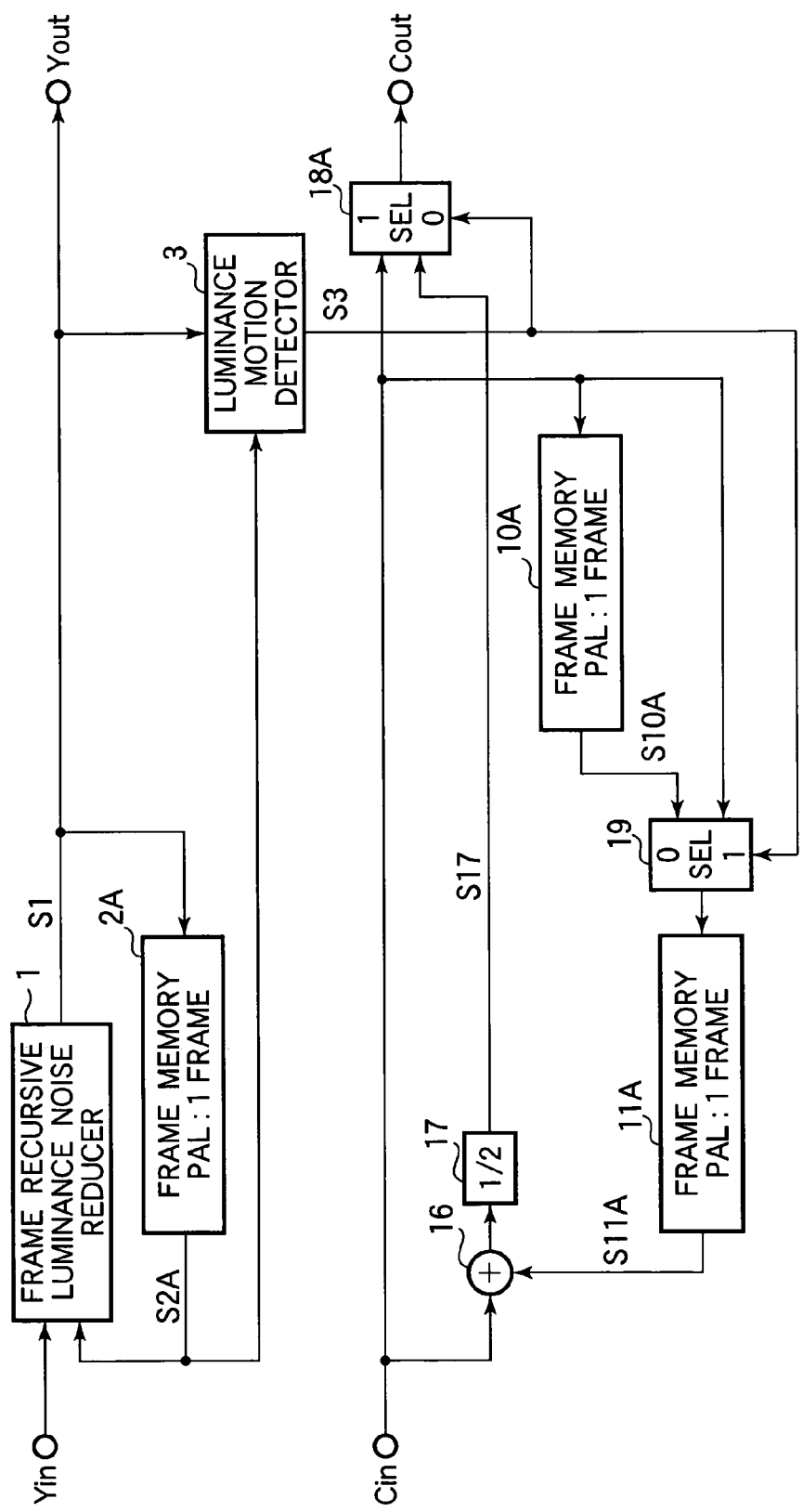
FIG. 2 is a block diagram of a video signal processor according to a second embodiment of the invention.

The second embodiment of the invention provides a video signal processor that processes PAL signals. Referring to FIG. 2, the video signal processor receives PAL luminance input signal data Yin and color difference input signal data Cin as input video data. A luminance signal noise rejection section removes noise from the luminance input signal data Yin and outputs a substantially noise-free luminance signal Yout. A cross-color noise rejection section removes cross-color noise from the color difference input signal data Cin and outputs a color difference signal Cout.

The luminance signal noise rejection section includes a frame recursive luminance noise reducer 1, a first video data memory (in this embodiment, a frame memory 2A), and a luminance motion detector 3. The frame recursive luminance noise reducer 1 and luminance motion detector 3 are identical to the corresponding elements in the first embodiment. The frame memory 2A stores the PAL luminance output signal data S1 generated by the frame recursive luminance noise reducer 1 as the luminance output Yout for one frame and provides one-frame-delayed luminance signal data S2A to the frame recursive luminance noise reducer 1 and luminance motion detector 3.

The cross-color noise rejection section includes a second video data memory (in this embodiment, a frame memory 10A), a third video data memory (in this embodiment, a selector 19 and a frame memory 11A), an averager (in this embodiment, an adder 16 and a divide-by-two circuit 17), and an output unit (a selector 18A). The output terminal of frame memory 10A is connected via selector 19 to the input terminal of frame memory 11A.

Frame memory 10A stores the input color difference input signal data Cin for one frame and outputs second delayed data (in this embodiment, 90° phase-offset color difference signal data S10A). Selector 19 selects either the 90° phase-offset color difference signal data S10A from frame memory 10A or the color difference input signal data Cin in accordance with the luminance motion signal S3 output by the luminance motion detector 3 and outputs the selected data to frame memory 11A. Frame memory 11A stores the data selected by selector 19 for one frame and outputs third delayed data (in this embodiment, 180° phase-offset color difference signal data S11A). The adder 16 adds the color difference input signal data Cin and the 180° phase-offset color difference signal data S10A; the divide-by-two circuit 17 halves the sum and outputs averaged color difference signal data S17A; selector 18A selects either the color difference input signal data Cin or the averaged color difference signal data S17 in accordance with the luminance motion signal S3, and outputs the selected data.

The operation of the second embodiment will be described next.

When the luminance input signal data Yin and the color difference input signal data Cin are input, the frame recursive luminance noise reducer 1 in the luminance signal noise rejection section takes the algebraic difference between the luminance input signal data Yin and the one-frame-delayed luminance signal data S2A output from the frame memory 2A. As in the first embodiment, if the filtered absolute value of the algebraic difference is smaller than a threshold, the difference is treated as noise and is subtracted from the luminance input signal data Yin to obtain the luminance output signal data S1 (Yout). If the filtered absolute value is greater than the threshold, the algebraic difference is treated as motion and the unaltered luminance input signal data Yin are used as the luminance output signal data S1 (Yout).

The frame memory 2A stores the luminance output signal data S1 from the frame recursive luminance noise reducer 1 and outputs the one-frame-delayed luminance signal data S2A. The luminance motion detector 3 takes the absolute value of the difference between the luminance output signal data S1 output from the frame recursive luminance noise reducer 1 and the one-frame-delayed luminance signal data S2A output from the frame memory 2A. If the absolute value is greater than a certain threshold determined in consideration of noise and jitter, the luminance motion detector 3 sets the luminance motion signal S3 to a value indicating that motion is present. Otherwise, the luminance motion detector 3 sets the luminance motion signal S3 to a value indicating that motion is absent.

Frame memory 10A in the cross-color noise rejection section stores the color difference input signal data Cin and outputs 90° phase-offset color difference signal data S10A to selector 19. If the luminance motion detector 3 determines that motion is present, selector 19 selects the color difference input signal data Cin in accordance with the luminance motion signal S3. If the luminance motion detector 3 determines that motion is absent, selector 19 selects the 90° phase-offset color difference signal data S10A in accordance with the luminance motion signal S3. The selected data are stored in frame memory 11A and output as the 180° phase-offset color difference signal data S11A.

Table 3 shows the relationship among the luminance input signal data Yin, the one-frame-delayed luminance signal data S2A stored in the frame memory 2A, the color difference input signal data Cin, the 90° phase-offset color difference signal data S10A stored in frame memory 10A, and the 180° phase-offset color difference signal data S11A stored in frame memory 11A.

TABLE 3

Luminance Signal Data and Color Difference Signal Data Stored in Frame Memories

|  | t − 1 (still picture) | t (still picture) | t + 1 (still picture) | ... | t + n (still picture) |
|---|---|---|---|---|---|
| Luminance signal Yin | $Y_{t-1}$ | $Y_t$ | $Y_{t+1}$ | ... | $Y_{t+n}$ |
| Data in frame memory 2A | $Y_{t-2}$ | $Y_{t-1}$ | $Y_t$ | ... | $Y_{t+n-1}$ |
| Color difference input signal data Cin | $C_{t-1}$ | $C_t$ | $C_{t+1}$ | ... | $C_{t+n}$ |
| Data in frame memory 10A | $C_{t-2}$ | $C_{t-1}$ | $C_t$ | ... | $C_{t+n-1}$ |
| Data in frame memory 11A | $C_{t-3}$ | $C_{t-2}$ | $C_{t-1}$ | ... | $C_{t+n-2}$ |

In this table, t represents time, Yt represents the luminance input signal data Yin at time t, and $C_t$ represents the color difference input signal data Cin at time t.

When the input video data form a still picture, the following formulas hold.

$$Y_{t-2} \approx Y_{t-1} \approx Y_t \approx Y_{t+1} \approx Y_{t+n} \quad (11)$$

$$C_{t-2} \approx C_{t-1} \approx C_t \approx C_{t+1} \approx C_{t+n} \quad (12)$$

From the relationship shown in table 3 and the formulas given above, the color difference signal Cout is obtained as listed in table 4.

TABLE 4

Stored Luminance Signal and Color Difference Signal and Output Color Difference Signal when a Still Picture is Formed

|  | t − 1 (still picture) | t (still picture) | t + 1 (still picture) | ... | t + n (still picture) |
|---|---|---|---|---|---|
| Luminance signal Yin | $Y_{t-1} \approx$ | $Y_t \approx$ | $Y_{t+1} \approx$ | ... | $Y_{t+n} \approx$ |
| Data in frame memory 2A | $Y_{t-2}$ | $Y_{t-1}$ | $Y_t$ | ... | $Y_{t+n-1}$ |
| Color difference input signal data Cin | $C_{t-1} \approx$ | $C_t \approx$ | $C_{t+1} \approx$ | ... | $C_{t+n} \approx$ |
| Data in frame memory 10A | $C_{t-2} \approx$ | $C_{t-1} \approx$ | $C_t \approx$ | ... | $C_{t+n-1} \approx$ |
| Data in frame memory 11A | $C_{t-3}$ | $C_{t-2}$ | $C_{t-1}$ | ... | $C_{t+n-2}$ |
| Color difference signal Cout | $(C_{t-1} + C_{t-3})/2$ | $(C_t + C_{t-2})/2$ | $(C_{t+1} + C_{t-1})/2$ | ... | $(C_{t+n} + C_{t+n-1})/2$ |

Accordingly, the cross-color component can be eliminated through averaging of the color difference input signal data Cin and the 180° phase-offset color difference signal data S11A output from frame memory 11A, performed by the adder 16 and divide-by-two circuit 17.

When a moving picture formed by the input video data changes to a still picture at time t+1, the following formulas hold.

$$Y_{t-2} \neq Y_{t-1} \neq Y_t \neq Y_{t+1} \approx Y_{t+n} \quad (13)$$

$$C_{t-2} \neq C_{t-1} \neq C_t \neq C_{t+1} \approx C_{t+n} \quad (14)$$

These formulas are listed in Table 5.

TABLE 5

Stored Luminance Signal and Color Difference Signal and Output Color Difference Signal when a Moving Picture Changes to a Still Picture

|  | t − 1 (moving picture) | t (moving picture) | t + 1 (still picture) | ... | t + n (still picture) |
|---|---|---|---|---|---|
| Luminance signal Yin | $Y_{t-1} \neq$ | $Y_t \neq$ | $Y_{t+1} \approx$ | ... | $Y_{t+n} \approx$ |
| Data in frame memory 2A | $Y_{t-2}$ | $Y_{t-1}$ | $Y_t$ | ... | $Y_{t+n-1}$ |
| Color difference input signal data Cin | $C_{t-1} \neq$ | $C_t \neq$ | $C_{t+1} \approx$ | ... | $C_{t+n} \approx$ |

TABLE 5-continued

Stored Luminance Signal and Color Difference Signal
and Output Color Difference Signal when a Moving Picture
Changes to a Still Picture

|  | t − 1 (moving picture) | t (moving picture) | t + 1 (still picture) | ... | t + n (still picture) |
|---|---|---|---|---|---|
| Data in frame memory 10A | $C_{t-2} \neq$ | $C_{t-1} \neq$ | $C_t \neq$ | ... | $C_{t+n-1} \approx$ |
| Data in frame memory 11A | $C_{t-3}$ | $C_{t-2}$ | $C_{t-1}$ | ... | $C_{t+n-2}$ |
| Color difference signal Cout | $C_{t-1}$ | $C_t$ | $(C_{t+1} + C_{t-1})/2$ | ... | $(C_{t+n-1} + C_{t+n-2})/2$ |

At time t+1, when a moving picture changes to a still picture, the luminance motion signal S3 is set to a value indicating that motion is absent because $Y_{t+1} \approx Y_t$. The adder 16 adds the color difference input signal data Cin and the 180° phase-offset color difference signal data S11A output from frame memory 11A, and the divide-by-two circuit 17 halves the sum and outputs averaged color difference signal data S17. However, because the color difference signal data differ ($C_{t-1} \neq C_{t+1}$), use of the averaged data $(C_{t+1} + C_{t-1})/2$ will cause image defects. Whether the color difference signal of the second preceding frame is usable or not cannot be decided from the luminance motion signal S3 of the current frame alone.

In order to avoid image defects, accordingly, selector 19 selects the color difference input signal data Cin and frame memory 11A stores data as listed in Table 6 when the luminance motion signal S3 is set to a value indicating that motion is present. The arrows in Table 6 indicate that when motion is detected, the data from the preceding frame are stored in both frame memories 10A and 11A.

TABLE 6

Stored Luminance Signal and Color Difference Signal
and Output Color Difference Signal when a Moving Picture
Changes to a Still Picture (2)

|  | t − 1 (moving picture) | t (moving picture) | t + 1 (still picture) | ... | t + n (still picture) |
|---|---|---|---|---|---|
| Luminance signal Cin Data in frame memory 2A | $Y_{t-1}$ $\neq$ $Y_{t-2}$ | $Y_t$ $\neq$ $Y_{t-1}$ | $Y_{t+1}$ $\approx$ $Y_t$ | ... | $Y_{t+n}$ $\approx$ $Y_{t+n-1}$ |
| Color difference input signal data Cin Data in frame memory 10A Data in frame memory 11A | $C_{t-1}$ $\neq$ $C_{t-2}$ = $C_{t-3}$ ($C_{t-2}$) | $C_t$ $\neq$ $C_{t-1}$ = $C_{t-2}$ ($C_{t-1}$) | $C_{t+1}$ $\approx$ $C_t$ = $C_{t-1}$ ($C_t$) | ... | $C_{t+n}$ $\approx$ $C_{t+n-1}$ $\approx$ $C_{t+n-2}$ |
| Color difference signal Cout | $C_{t-1}$ | $C_t$ | $(C_{t+1} + C_t)/2$ | ... | $(C_{t+n-1} + C_{t+n-2})/2$ |

The formula at time t+1 ($C_{t+1} \approx C_t = C_{t-1}$) indicates that the color difference signal data $C_{t-1}$ and $C_{t+1}$ are substantially equal ($C_{t-1} \approx C_{t+1}$). Therefore, use of the averaged data $(C_{t+1} + C_t)/2$ will not cause image defects.

When the input video data form a moving picture, the following formulas hold.

$$Y_{t-2} \neq Y_{t-1} \neq Y_t \neq Y_{t+1} \neq Y_{t+n} \tag{15}$$

$$C_{t-2} \neq C_{t-1} \neq C_t \neq C_{t+1} \neq C_{t+n} \tag{16}$$

These formulas are listed in Table 7.

TABLE 7

Stored Luminance Signal and Color Difference Signal
and Output Color Difference Signal when a Moving Picture is
Formed

|  | t − 1 (moving picture) | t (moving picture) | t + 1 (moving picture) | ... | t + n (moving picture) |
|---|---|---|---|---|---|
| Luminance signal Cin Data in frame memory 2A | $Y_{t-1}$ $\neq$ $Y_{t-2}$ | $Y_t$ $\neq$ $Y_{t-1}$ | $Y_{t+1}$ $\neq$ $Y_t$ | ... | $Y_{t+n}$ $\neq$ $Y_{t+n-1}$ |
| Color difference input signal data Cin Data in frame memory 10A Data in frame memory 11A | $C_{t-1}$ $\neq$ $C_{t-2}$ = $C_{t-3}$ ($C_{t-2}$) | $C_t$ $\neq$ $C_{t-1}$ $\approx$ $C_{t-2}$ ($C_{t-1}$) | $C_{t+1}$ $\neq$ $C_t$ = $C_{t-1}$ ($C_t$) | ... | $C_{t+n}$ $\neq$ $C_{t+n-1}$ = $C_{t+n-2}$ ($C_{t+n-1}$) |
| Color difference signal Cout | $C_{t-1}$ | $C_t$ | $C_{t+1}$ | ... | $C_{t+n}$ |

Because the input video data form a moving picture, frame memory 11A and frame memory 10A store the same data. Because of the motion, the absolute value of the difference between the luminance output signal data S1 and the one-frame-delayed luminance signal data S2A output from the frame memory 2A exceeds the threshold mentioned above, and the luminance motion detector 3 detects the motion. Selector 18A then selects the color difference input signal data Cin rather than the averaged color difference signal data S17 obtained from the color difference input signal data Cin and the 180° phase-offset color difference signal data S11A output from frame memory 11A, and outputs the selected color difference input signal data Cin directly as a color difference output signal data Cout. Therefore, no image defects will occur.

When a still picture formed by the input video data changes to a moving picture, the following formulas hold.

$$Y_{t-2} \approx Y_{t-1} \approx Y_t \neq Y_{t+1} \neq Y_{t+n} \tag{17}$$

$$C_{t-2} \approx C_{t-1} \approx C_t \neq C_{t+1} \neq C_{t+n} \tag{18}$$

These formulas are listed in Table 8.

TABLE 8

Stored Luminance Signal and Color Difference Signal and Output Color Difference Signal when a Still Picture Changes to a Moving Picture

|  | t − 1 (still picture) | t (still picture) | t + 1 (moving picture) | ... | t + n (moving picture) |
|---|---|---|---|---|---|
| Luminance signal Cin Data in frame memory 2A | $Y_{t-1}$ ≈ $Y_{t-2}$ | $Y_t$ ≈ $Y_{t-1}$ | $Y_{t+1}$ ≠ $Y_t$ | ... | $Y_{t+n}$ ≠ $Y_{t+n-1}$ |
| Color difference input signal data Cin Data in frame memory 10A Data in frame memory 11A | $C_{t-1}$ ≈ $C_{t-2}$ ≈ $C_{t-3}$ | $C_t$ ≈ $C_{t-1}$ ≈ $C_{t-2}$ | $C_{t+1}$ ≠ $C_t$ ≈ $C_{t-1}$ | ... | $C_{t+n}$ ≠ $C_{t+n-1}$ = $C_{t+n-2}$ ($C_{t+n-1}$) |
| Color difference signal Cout | ($C_{t-1}$ + $C_{t-3}$)/2 | ($C_{t-2}$ + $C_t$)/2 | $C_{t+1}$ | ... | $C_{t+n}$ |

While the input video data form a still picture, the formulas $C_{t-2} \approx C_{t-1}$ and $C_{t-1} \approx C_t$ hold, and selector 18A selects the averaged color difference signal data S17 and outputs the data as a color difference signal Cout. While the input video data form a moving picture, the formulas $Y_t \neq Y_{t+1}$ and $Y_{t+1} \neq Y_{t+n}$ hold, and selector 18A selects the color difference input signal data Cin and outputs the signal directly as a color difference signal Cout.

When PAL video data are input, the luminance frame memory 2A of a conventional signal processor stores two frames of luminance data. In the second embodiment, the luminance frame memory 2A stores only one frame, but the cross-color rejection noise section is structured so that so that when a moving picture changes to a still picture, the averager averages the first still frame with the immediately preceding frame (which is substantially identical to the first still frame) instead of with the second preceding frame (which differs from the first still frame). It is therefore avoid image defects without having to compare the current frame with the second preceding frame to detect motion.

The capacities of the frame memories 10A and 11A storing the color difference signals for PAL are determined in accordance with the following ratios:

NTSC input video data Y:Cb:Cr=4:2:2
PAL input video data Y:Cb:Cr=4:1:1 where Y represents the luminance signal, Cb represents the blue color difference signal, and Cr represents the red color difference signal. Cross-color noise can therefore be eliminated from PAL signals with no more memory capacity than required for NTSC signals.

THIRD EMBODIMENT

Figure 3:
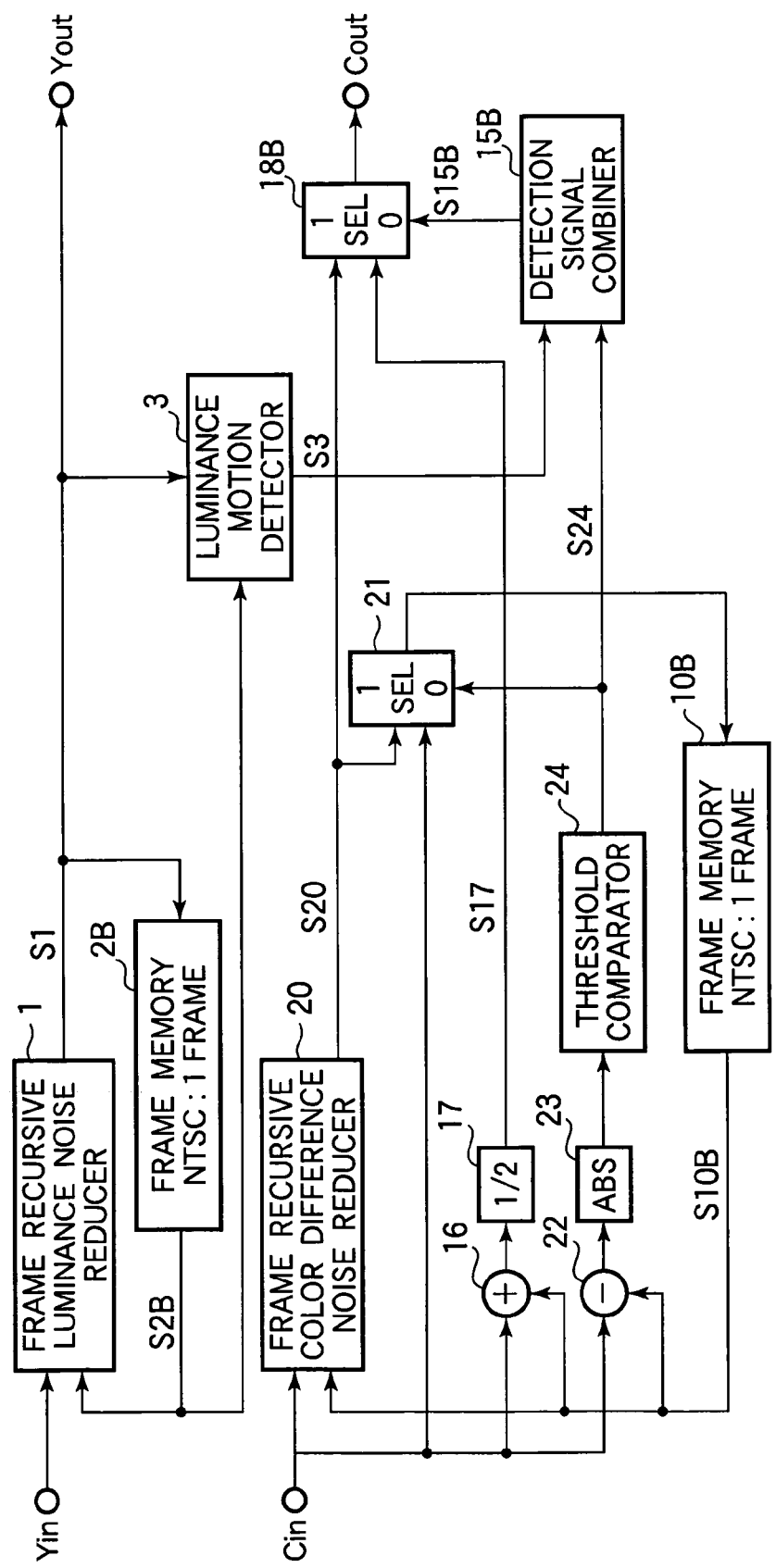
FIG. 3 is a block diagram of a video signal processor according to a third embodiment of the invention.

The third embodiment of the invention provides a video signal processor that processes NTSC signals. Referring to FIG. 3, the video signal processor receives NTSC luminance input signal data Yin and color difference input signal data Cin as input video data. A luminance signal noise rejection section removes noise from the luminance input signal data Yin and outputs a substantially noise-free luminance signal Yout. A cross-color noise rejection section removes cross-color noise and random noise from the color difference input signal data Cin and outputs a substantially noise-free color difference signal Cout.

The luminance signal noise rejection section includes a frame recursive luminance noise reducer 1, a first video data memory (in this embodiment, a frame memory 2B), and a luminance motion detector 3. The frame recursive luminance noise reducer 1 and luminance motion detector 3 are identical to the corresponding elements in the first embodiment. The frame memory 2B stores the NTSC luminance output signal data S1 output by the frame recursive luminance noise reducer 1 as the luminance signal Yout for one frame and provides one-frame-delayed luminance signal data S2B to the frame recursive luminance noise reducer 1 and luminance motion detector 3.

The cross-color noise rejection section includes a frame recursive color difference noise reduction circuit (in this embodiment, a frame recursive color difference noise reducer 20), a selector 21, a second video data memory (in this embodiment, a frame memory 10B), a color difference noise reduction decision circuit (in this embodiment, a subtractor 22, an absolute value circuit 23, and a threshold comparator 24), a detection signal combiner 15B, an averager (in this embodiment, an adder 16 and a divide-by-two circuit 17), and an output unit (a selector 18B). The output terminal of the frame recursive color difference noise reducer 20 is connected via selector 21 to frame memory 10B. The output terminal of frame memory 10B is connected to the frame recursive color difference noise reducer 20, the subtractor 22 in the color difference noise reduction decision circuit, and the adder 16 in the second selection circuit. The output terminal of the subtractor 22 is connected to the absolute value circuit 23. The output terminal of the absolute value circuit 23 is connected to the threshold comparator 24. The output terminal of the threshold comparator 24 is connected to the detection signal combiner 15B. The adder 16 and divide-by-two circuit 17 are disposed on the input terminal side of selector 18B. The output terminal of the adder 16 is connected to the divide-by-two circuit 17. The output terminal of the divide-by-two circuit 17 is connected to selector 18B.

The frame recursive color difference noise reducer 20 removes noise on the basis of the difference between the color difference input signal data Cin and second delayed data (in this embodiment, 180° phase-offset color difference signal data S10B) and outputs noise-free color difference signal data S20. Selector 21 selects either the color difference input signal data Cin or the noise-free color difference signal data S20 in accordance with the color difference noise reduction decision signal S24 output from the threshold comparator 24, and outputs the selected data to frame memory 10B. Frame memory 10B stores the data selected by selector 21 for one frame and outputs the 180° phase-offset color difference signal data S10B.

The subtractor 22 in the color difference noise reduction decision circuit takes the difference between the color difference input signal data Cin and the 180° phase-offset color difference signal data S10B. The absolute value circuit 23 obtains the absolute value of the difference. The threshold comparator 24 detects color difference noise from the absolute value obtained by the absolute value circuit 23 and outputs the result as color difference noise reduction decision signal S24. The detection signal combiner 15B combines the luminance motion signal S3 output from the luminance motion detector 3 and the color difference noise reduction decision signal S24 output from the threshold comparator 24, and outputs a combined motion detection signal S15B to selector 18B of the second selection circuit.

The adder 16 adds the color difference input signal data Cin and the 180° phase-offset color difference signal data S10B. The divide-by-two circuit 17 halves the sum and outputs averaged color difference signal data S17. Selector 18B selects either the averaged color difference signal data S17 or the noise-free color difference signal data S20 from the frame recursive color difference noise reducer 20 in accordance with the combined motion detection signal S15B from the detection signal combiner 15B, and outputs the selected data as a color difference signal Cout.

The operation of the third embodiment will be described next.

When the luminance input signal data Yin and the color difference input signal data Cin are input, the frame recursive luminance noise reducer 1 in the luminance signal noise rejection section takes the algebraic difference between the luminance input signal data Yin and the one-frame-delayed luminance signal data S2B output from the frame memory 2B. As in the first embodiment, if the filtered absolute value of the algebraic difference is smaller than a threshold, the algebraic difference is treated as noise and is subtracted from the luminance input signal data Yin to obtain the luminance output signal data S1 (Yout). Otherwise, the algebraic difference is treated as motion and the unaltered luminance input signal data Yin are used as the luminance output signal data S1 (Yout).

The frame memory 2B stores the luminance output signal data S1 for one frame and outputs the one-frame-delayed luminance signal data S2. The luminance motion detector 3 takes the absolute value of the difference between the luminance output signal data S1 output from the frame recursive luminance noise reducer 1 and the one-frame-delayed luminance signal data S2B output from the frame memory 2B. If the absolute value is greater than a threshold, the luminance motion detector 3 sets the luminance motion signal S3 to a value indicating that motion is present. Otherwise, the luminance motion detector 3 sets the luminance motion signal S3 to a value indicating that motion is absent.

The frame recursive color difference noise reducer 20 in the cross-color noise rejection section takes the algebraic difference between the color difference input signal data Cin and the 180° phase-offset color difference signal data SLOB from frame memory 10B. If the absolute value of the algebraic difference is smaller than a threshold, the algebraic difference is treated as color difference noise. If the absolute value of the algebraic difference is greater than a threshold, the algebraic difference is treated as cross-color noise. When treated as color difference noise, the algebraic difference is subtracted from the color difference input signal data Cin, and the result is output as the noise-free color difference signal data S20. When the algebraic difference is treated as cross-color noise, the color difference input signal data Cin is output without alteration as the noise-free color difference signal data S20.

When cross-color noise is present, large-amplitude flicker noise appears, making other color difference noise inconspicuous. If cross-color noise is absent, flicker noise is also absent, making other noise conspicuous. The subtractor 22 and absolute value circuit 23 obtain the absolute difference between the 180° phase-offset color difference signal data SLOB and the color difference input signal data Cin. If the absolute difference is greater than a threshold, the threshold comparator 24 sets the color difference noise reduction decision signal S24 to a value indicating that cross-color noise is present. If the absolute difference is smaller than the threshold, the threshold comparator 24 sets the color difference noise reduction decision signal S24 to a value indicating that color difference noise is absent.

When the color difference noise reduction decision signal S24 indicates that cross-color noise is present, selector 21 selects the color difference input signal data Cin. When the color difference noise reduction decision signal S24 indicates that cross-color noise is absent, selector 21 selects the noise-free color difference signal data S20 from the frame recursive color difference noise reducer 20. Frame memory 10B stores the selected data for one frame and outputs the 180° phase-offset color difference signal data S10B.

The detection signal combiner 15B combines the luminance motion signal S3 output from the luminance motion detector 3 and the color difference noise reduction decision signal S24 output from the threshold comparator 24. When the luminance motion signal S3 indicates that motion is absent and when the color difference noise reduction decision signal S24 indicates that cross-color noise is present, the combined motion detection signal S15B is given a value that causes selector 18B to select the averaged color difference signal data S17. When the luminance motion signal S3 indicates that motion is present or the color difference noise reduction decision signal S24 indicates that cross-color noise is absent, the combined motion detection signal S15B is given a value that causes selector 18B to select the noise-free color difference signal data S20 from the frame recursive color difference noise reducer 20. The data selected by selector 18B become the color difference output (Cout) of the video signal processor.

Conventional video signal processors require a frame memory for cross-color noise reduction to be used even in frames in which cross-color noise reduction is not performed. If frame recursive noise color difference noise reduction is performed in these frames, another memory is required in addition to the memory for cross-color noise reduction. In the third embodiment, the single 10B serves for both cross-color noise reduction and frame recursive color difference noise reduction, one type of noise reduction or the other being selected in each frame.

Conventional cross-color noise reduction uses averaging. Random noise is always halved (−6 dB), regardless of the type of random noise, and much random noise inevitably remains. According to the third embodiment, cross-color noise reduction and frame recursive color difference noise reduction are switched on a frame basis. In frames in which recursive color difference noise reduction is selected, random color difference noise can be eliminated more effectively, further improving picture quality.

FOURTH EMBODIMENT

Figure 4:
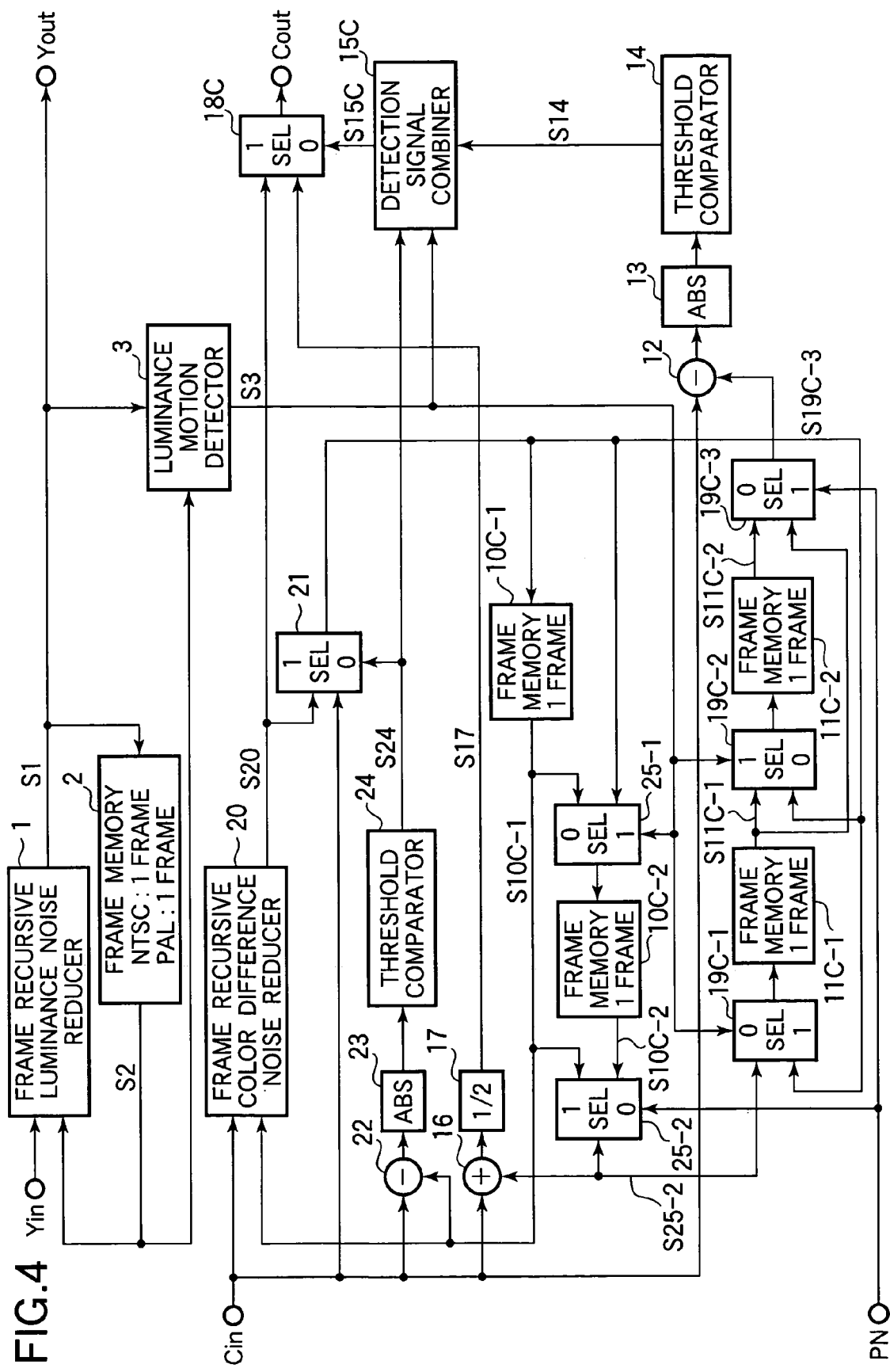
FIG. 4 is a block diagram of a video signal processor according to a fourth embodiment of the invention.

The video signal processor in the fourth embodiment processes both PAL and NTSC signals, as selected by a video system control signal, more specifically a PAL-NTSC selection signal PN. Referring to FIG. 4, the video signal processor receives luminance input signal data Yin and color difference input signal data Cin as input video data. A luminance signal noise rejection section removes noise from the luminance input signal data Yin and outputs a noise-free luminance signal Yout. A cross-color rejection section removes cross-color noise from the color difference input signal data Cin and outputs a color difference signal Cout.

The luminance signal noise rejection section includes a frame recursive luminance noise reducer 1, a frame memory 2, and a luminance motion detector 3 as described in the first embodiment.

The cross-color rejection section of the fourth embodiment includes a frame recursive color difference noise reducer 20 and other elements included in the first to third embodiments, as well as some additional elements. The output terminal of the frame recursive color difference noise reducer 20 is connected to a selector 21. The output terminal of selector 21 is connected to a frame memory 10C-1 and a pair of selectors 19C-1, 19C-2. The output terminal of frame memory 10C-1 is connected to the frame recursive color difference noise reducer 20, a subtractor 22, and another pair of selectors 25-1 and 25-2. Subtractor 22 is followed by an absolute value circuit 23 and a threshold comparator 24 as in the third embodiment. The output terminal of selector 25-1 is connected to another frame memory 10C-2. The output terminal of frame memory 10C-2 is connected to selector 25-2. The output terminal of selector 25-2 is connected to selector 19C-1. The output terminal of selector 19C-1 is connected to yet another frame memory 11C-1. The output terminal of frame memory 11C-1 is connected to selector 19C-2. The output terminal of selector 19C-2 is connected to still another frame memory 11C-2. The output terminal of frame memory 11C-2 is connected to another selector 19C-3. The output terminal of selector 19C-3 is connected to a subtractor 12, which is followed by an absolute value circuit 13 and a threshold comparator 14 as in the first embodiment. The output terminals of the two threshold comparators 14, 24 are connected to a detection signal combiner 15C. The output terminal of the detection signal combiner 15C is connected to a selector 18C.

As in the third embodiment, the frame recursive color difference noise reducer 20 removes noise on the basis of the difference between the color difference input signal data Cin and delayed color difference signal data S10C-1 and outputs a noise-free color difference signal data S20. Selector 21 selects either the color difference input signal data Cin or the noise-free color difference signal data S20 in accordance with a color difference noise reduction decision signal S24. Frame memory 10C-1 stores the data selected by selector 21 for one frame interval and outputs a delayed color difference signal data S10C-1. Subtractor 22 takes the difference between the color difference input signal data Cin and the delayed color difference signal data S10C-1 from frame memory 10C-1. Absolute value circuit 23 obtains the absolute value of the difference. Threshold comparator 24 detects cross-color noise from the absolute value obtained by absolute value circuit 23 and outputs the color difference noise reduction decision signal S24.

Selector 25-1 selects either the delayed color difference signal data S10C-1 from frame memory 10C-1 or the data selected by selector 21 in accordance with the luminance motion signal S3 output from the luminance motion detector 3. Frame memory 10C-2 stores the data selected by selector 25-1 for one frame interval and outputs delayed color difference signal data S10C-2. Selector 25-2 selects either the delayed color difference signal data S10C-1 from frame memory 10C-1 or the delayed color difference signal data S10C-2 from frame memory 10C-2 in accordance with the PAL-NTSC selection signal PN, and outputs the selected data as 180° phase-offset color difference signal data S25-2.

Selector 19C-1 selects either the 180° phase-offset color difference signal data S25-2 selected by selector 25-2 or the data selected by selector 21 in accordance with the luminance motion signal S3. Frame memory 11C-1 stores the data selected by selector 19C-1 for one frame interval and outputs delayed color difference signal data S11C-1. Selector 19C-2 selects either the delayed color difference signal data S11C-1 or the data from selector 21 in accordance with the luminance motion signal S3. Frame memory 11C-2 stores the data selected by selector 19C-2 for one frame interval and outputs delayed color difference signal data S11C-2.

Selector 19C-3 selects either the delayed color difference signal data S11C-2 from frame memory 11C-2 or the delayed color difference signal data S11C-1 from frame memory 11C-1 in accordance with the PAL-NTSC selection signal PN, and outputs 0° phase-offset color difference signal data S19C-3. The subtractor 12 takes the difference between the color difference input signal data Cin and the 0° phase-offset color difference signal data S19C-3 from selector 19C-3. The absolute value circuit 13 obtains the absolute value of the difference. The threshold comparator 14 determines whether motion is present in accordance with the absolute value obtained by the absolute value circuit 13, and outputs the result as a color difference motion signal S14.

The detection signal combiner 15C combines the color difference motion signal S14, the luminance motion signal S3 output from the luminance motion detector 3, and the color difference noise reduction decision signal S24 output from the threshold comparator 24, and outputs a combined motion detection signal S15C to selector 18C. Selector 18C selects either the averaged color difference signal data S17, which are obtained from the color difference input signal data Cin and the 180° phase-offset color difference signal data S25-2 by the adder 16 and the divide-by-two circuit 17, or the noise-free color difference signal data S20 from the frame recursive color difference noise reducer 20, in accordance with the combined motion detection signal S15C, and outputs the selected data as a color difference signal Cout.

The operation of the fourth embodiment will be described next.

When the luminance input signal data Yin and the color difference input signal data Cin are input, the frame recursive luminance noise reducer 1 of the luminance signal noise rejection section takes the algebraic difference between the luminance input signal data Yin and the one-frame-delayed luminance signal data S2 output from the frame memory 2, and operates as described in the first embodiment to generate the luminance output signal data S1 used as luminance output Yout of the signal processing unit.

Frame memory 2 stores the luminance output signal data S1 for one frame interval and outputs the one-frame-delayed luminance signal data S2. The luminance motion detector 3 takes the absolute value of the difference between the luminance output signal data S1 output from the frame recursive luminance noise reducer 1 and the one-frame-delayed luminance signal data S2 output from the frame memory 2. If the absolute value is greater than a threshold, the luminance motion detector 3 sets the luminance motion signal S3 to a value indicating that motion is present. Otherwise, the luminance motion detector 3 sets the luminance motion signal S3 to a value indicating that motion is absent.

The frame recursive color difference noise reducer 20 in the cross-color noise rejection section takes the algebraic difference between the color difference input signal data Cin and the delayed color difference signal data S10C-1 output from frame memory 10C-1. As in the third embodiment, if the absolute value of the algebraic difference is smaller than a threshold, the algebraic difference is treated as color difference noise and is subtracted from the color difference input signal data Cin to obtain the noise-free color difference signal data S20. If the absolute value of the algebraic difference is greater than the threshold, the algebraic difference is treated as cross-color noise and the color difference input signal data Cin are output without alteration as the noise-free color difference signal data S20.

Also as in the third embodiment, subtractor 22 and absolute value circuit 23 obtain the absolute difference between the delayed color difference signal data S10C-1 from frame memory 10C-1 and the color difference input signal data Cin. If the absolute difference is greater than a threshold, the threshold comparator 24 sets the color difference noise reduction decision signal S24 to a value indicating that cross-color noise is present and selector 21 selects the color difference input signal data Cin. If the absolute difference is smaller than the threshold, the threshold comparator 24 sets the color difference noise reduction decision signal S24 to a value indicating that cross-color noise is absent, and selector 21 selects the noise-free color difference signal data S20 output from the frame recursive color difference noise reducer 20. Frame memory 10C-1 stores the data selected by selector 21 for one frame interval and outputs delayed color difference signal data S10C-1.

When the luminance motion detector 3 determines that motion is present, the luminance motion signal S3 causes selector 25-1 to select the color difference input signal data Cin or the noise-free color difference signal data S20, whichever was selected by selector 21. When the luminance motion detector 3 determines that motion is absent, the luminance motion signal S3 causes selector 25-1 to select the delayed color difference signal data S10C-1 from frame memory 10C-1. Frame memory 10C-2 stores the selected data for one frame interval and outputs delayed color difference signal data 10C-2.

When the PAL-NTSC selection signal PN selects NTSC, selector 25-2 selects the delayed color difference signal data S10C-1 from frame memory 10C-1. When the PAL-NTSC selection signal PN selects PAL, selector 25-2 selects the delayed color difference signal data S10C-2 from frame memory 10C-2. The selected data are output as 180° phase-offset color difference signal data S25-2.

When the luminance motion detector 3 determines that motion is present, the luminance motion signal S3 causes selector 19C-1 to select the data output from selector 21: either the color difference input signal data Cin or the noise-free color difference signal data S20. If the luminance motion detector 3 determines that motion is absent, the luminance motion signal S3 causes selector 19C-1 to select the 180° phase-offset color difference signal data S25-2 from selector 25-2. Frame memory 11C-1 stores the selected data for one frame interval and outputs delayed color difference signal data S11C-1.

When the luminance motion detector 3 determines that motion is present, the luminance motion signal S3 causes selector 19C-2 to select the output of selector 21, which is the color difference input signal data Cin or the noise-free color difference signal data S20. When the luminance motion detector 3 determines that motion is absent, the luminance motion signal S3 causes selector 19C-2 to select the delayed color difference signal data S11C-1 from frame memory 11C-1. Frame memory 11C-2 stores the selected data for one frame interval and outputs delayed color difference signal data S11C-2.

When the PAL-NTSC selection signal PN selects NTSC, selector 19C-3 selects the delayed color difference signal data S11C-1 from frame memory 11C-1. When the PAL-NTSC selection signal PN selects PAL, selector 19C-3 selects the delayed color difference signal data S11C-2 from frame memory 11C-2. The selected data are output as 0° phase-offset color difference signal data S19C-3.

Subtractor 12 takes the difference between the color difference input signal data Cin and the 0° phase-offset color difference signal data S19C-3. Absolute value circuit 13 obtains the absolute value of the difference. If the absolute value is greater than a certain threshold determined in consideration of noise and jitter, the threshold comparator 14 sets the color difference motion signal S14 to a value indicating that motion is present. Otherwise, the threshold comparator 14 sets the color difference motion signal S14 to a value indicating that motion is absent.

The detection signal combiner 15C combines the luminance motion signal S3, the color difference motion signal S14, and the color difference noise reduction decision signal S24, and outputs a combined motion detection signal S15 to selector 18C. When cross-color noise is detected by threshold comparator 24 and motion is not detected by either the luminance motion detector 3 or threshold comparator 14, selector 18C selects the averaged color difference signal data S17, which are obtained by adding the color difference input signal data Cin and the 180° phase-offset color difference signal data S25-2 from selector 25-2 in the adder 16 and halving the sum in the divide-by-two circuit 17. When the luminance motion detector 3 determines that luminance motion is present, threshold comparator 14 determines that color difference motion is present, or threshold comparator 24 fails to detect cross-color noise, selector 18C selects the noise-free color difference signal data S20 output from the frame recursive color difference noise reducer 20. Selector 18C outputs the selected data as a color difference output signal data Cout.

The fourth embodiment produces the following effects:

(i) The threshold comparator 14 detects motion by making a 0° phase (in-phase) comparison, using the frame memories 10C-1 and 11-C to obtain a two-frame delay for NTSC or the frame memories 10C-1, 10C-2, 11C-1, and 11C-2 to obtain a four-frame delay for PAL. The color-difference in-phase comparison can detect motion when the only motion in the luminance signal is present in a high frequency component such as a component near the fsc frequency, which is removed from the luminance signal during Y/C separation and becomes cross-color noise, for example, or even if motion is present only in the color difference component signals, so that the color difference input signal data Cin changes while the luminance signal remains substantially unchanged at all frequencies. Consequently, color difference averaging in the presence of motion, which leads to color smear, can be avoided regardless of the signal (luminance or color difference) in which the motion occurs, and regardless of the frequency band in which the motion occurs.

(ii) When PAL video data are input, the frame memory 2 does not have to store two frames of luminance signal data as in conventional video signal processors. Color difference motion across two frames can be detected even though the only one luminance frame is stored. Accordingly, the cross-color noise rejection section can avoid color motion image defects without having to store more than one frame of luminance signal data.

(iii) When cross-color noise is absent, frame recursive color difference noise reduction is used so that a greater random noise reduction effect can be achieved than the −6-db effect achieved by conventional averaging. Cross-color noise reduction and frame recursive color difference noise reduction are switchable on a frame basis, further improving picture quality.

(iv) Conventional video signal processors require a frame memory for cross-color noise reduction to be used even in frames in which cross-color noise reduction is not performed. If frame recursive color difference noise reduction is performed in these frames, another memory is required in addition to the memory for cross-color noise reduction. In the fourth embodiment, the frame memories for color difference noise reduction 10C-1, 10C-2, 11C-1, and 11C-2 serve for both cross-color noise reduction and frame recursive color difference noise reduction, one type of noise reduction or the other being selected in each frame.

FIFTH EMBODIMENT

In a fifth, sixth, and seventh embodiments, the color difference input signal data and the averaged color difference data are combined in a ratio that depends on the degree of motion detected. More specifically, degrees of motion are detected by making comparisons with a plurality of thresholds to obtain a motion coefficient K. The color difference input signal data are multiplied by K, the averaged color difference data are multiplied by 1–K, and the two products are added together to obtain the output color difference signal Cout.

The fifth embodiment is based on the first embodiment and includes all of the elements shown in FIG. 1 except the luminance motion detector 3, threshold comparator 14, detection signal combiner 15, and selector 18, which are replaced by the luminance motion detector 3D, threshold comparator 14D, motion coefficient generator 35, and output unit 40 shown in FIG. 5. In addition, a filter 36 is inserted between the subtractor 12 and absolute value circuit 13, as also shown in FIG. 5. The signals S2, Sit, S17, and Cin in FIG. 5 are the same as in FIG. 1.

The luminance motion detector 3D comprises a subtractor 31, a filter 32, an absolute value circuit 33, and a motion detector 34, which are interconnected in this order. The subtractor 31 takes the difference between the luminance output signal data S1 output from the frame recursive luminance noise reducer 1 and the one-frame-delayed luminance signal data S2 read from the frame memory 2. The filter 32 filters the difference to reduce the effects of noise and jitter. The absolute value circuit 33 takes the absolute value of the filtered difference. The motion detector 34 compares the resulting absolute frame-to-frame difference with a series of threshold values as explained below to obtain a luminance motion coefficient Ky, which is supplied to the motion coefficient generator 35.

In the cross-color rejection section, the filter 36 provided between the subtractor 12 and the absolute value circuit 13 filters the difference output from the subtractor 12 to reduce the effects of noise and jitter. The absolute value circuit 13 takes the absolute value of the filtered difference and outputs it as an absolute 0° phase-offset color difference value. The threshold comparator 14D compares the absolute 0° phase-offset color difference value with a series of threshold values to obtain a color difference motion coefficient Kc, which is also supplied to the motion coefficient generator 35.

The motion coefficient generator 35 functions as a detection signal combiner by selecting the greater of the two coefficients Ky and Kc received from the motion detector 34 and the threshold comparator 14D and outputs the selected value and a complementary value to the output unit 40. The output unit 40 includes a first multiplier 41, a second multiplier 42, and an adder 43 connected to the output terminals of the multiplier 41 and multiplier 42. Multiplier 41 multiplies the color difference input signal data Cin by the selected motion coefficient. Multiplier 42 multiplies the averaged color difference signal data S17 from the divide-by-two circuit 17 by the complementary coefficient. The adder 43 adds the two products.

The function of the filters 32 and 36 is to eliminate data other than motion, such as noise and jitter. The filters 32 and 36 may be low-pass filters (LPFs), median filters, or combinations of a plurality of filters, including a 'filter' that simply passes the difference value through without change. If a combination of filters is used, the maximum value of the plurality of resulting signals may be taken (to stress motion detection), the minimum value may be taken (to stress noise reduction), or the mean or median value may be taken. The filters 32 and 36 may also be omitted.

The operation of the fifth embodiment will now be described in further detail.

When the luminance input signal data Yin and the color difference input signal data Cin are input, the luminance output signal data S1 output from the frame recursive luminance noise reducer 1 and the one-frame-delayed luminance signal data S2 output from the frame memory 2 are input to the luminance motion detector 3D. At the same time, the color difference input signal data Cin and the 0° phase-offset color difference signal data S11 output from frame memory 11 are input to the subtractor 12.

In the luminance motion detector 3D, the subtractor 31 takes the difference between the luminance output signal data S1 and the one-frame-delayed luminance signal data S2; the filter 32 filters the resulting frame-to-frame luminance difference signal to reduce the effect of noise and jitter; the absolute value circuit 33 takes the absolute value of the filtered difference; the motion detector 34 compares the absolute frame-to-frame luminance difference signal with a luminance motion threshold TH1 and a series of successively higher thresholds to determine the value of the luminance motion coefficient Ky output to the motion coefficient generator 35. Specifically, the value of the luminance motion coefficient Ky is derived from the series of comparisons in Table 9, which are performed in the listed order, from top to bottom in the table, until one of the comparisons succeeds.

TABLE 9

Determination of Ky from Absolute Frame-to-Frame Luminance Difference

| Comparison | Value of Ky |
|---|---|
| Absolute difference < TH1 | 0 |
| Absolute difference < TH1 + 1 | ¼ |
| Absolute difference < TH1 + 2 | ½ |
| Absolute difference < TH1 + 3 | ¾ |
| Absolute difference ≧ TH1 + 3 | 1 |

In the cross-color rejection section, the subtractor 12 takes the difference between the color difference input signal data Cin and the 0° phase-offset color difference signal data S11, which are delayed by two frames for NTSC or by four frames for PAL by the frame memories 10 and 11; the filter 36 filters the difference to remove the effect of noise and jitter; the absolute value circuit 13 takes the absolute value of the filtered difference; and the threshold comparator 14D compares the resulting absolute 0° phase color difference value with a 0° phase color difference motion threshold TH2 and a series of successively higher thresholds to determine the color difference motion coefficient Kc output to the motion coefficient generator 35. Specifically, the value of the color difference motion coefficient Kc is calculated by the series of comparisons shown in Table 10, which are performed in the listed order until one of the comparisons succeeds.

TABLE 10

Determination of Kc from Absolute 0° Phase Color Difference

| Comparison | Value of Kc |
|---|---|
| Absolute difference < TH2 | 0 |
| Absolute difference < TH2 + 1 | ¼ |
| Absolute difference < TH2 + 2 | ½ |
| Absolute difference < TH2 + 3 | ¾ |
| Absolute difference ≧ TH2 + 3 | 1 |

The motion coefficient generator 35 selects either the luminance motion coefficient Ky or the color difference motion coefficient Kc, whichever is greater, as the coefficient K, calculates the complement K with respect to unity, and outputs the coefficients (K and 1−K) thus obtained to the multipliers 41 and 42. Multiplier 41 multiplies the color difference input signal data Cin by the selected motion coefficient K; multiplier 42 multiplies the averaged color difference signal data S17 by the complementary motion coefficient 1−K; the adder 43 adds the two products and outputs the sum as the color difference signal Cout. The value of the color difference signal Cout depends on the value of K as shown in Table 11.

TABLE 11

Determination of Cout from Selected Motion Coefficient K

| K | Value of Cout |
|---|---|
| 0 | (S17 × 1) |
| ¼ | (Cin × ¼) + (S17 × ¾) |
| ½ | (Cin × ½) + (S17 × ½) |
| ¾ | (Cin × ¾) + (S17 × ¼) |
| 1 | (Cin × 1) |

The fifth embodiment accordingly detects different degrees of luminance motion and color difference motion, combines them into a single motion coefficient K, and then combines the color difference input signal data with the averaged color difference signal data in a proportion determined by the coefficient K to obtain the color difference output signal data Cout. As in the preceding embodiments, motion can be reliably detected from the color difference signal even when motion is undetectable in the luminance signal. In addition, cross-color noise reduction is switched on and off in a semi-continuous series of steps, corresponding to different proportions in which the input color difference input signal data Cin and the averaged color difference signal are combined, making the operation of the cross-color rejection section smoother than in the first embodiment.

The first embodiment can be considered as a special case of the fifth embodiment, in which the selected motion coefficient K is always either 1 or 0.

SIXTH EMBODIMENT

The sixth embodiment is similar to the fifth embodiment, but is based on the second embodiment instead of the first embodiment, and is used with a PAL component video signal.

The video signal processor in the sixth embodiment has a frame recursive luminance noise reducer 1, frame memory 2A, frame memories 10A, 11A, an adder 16, a divide-by-two circuit 17, and a selector 19 as shown in FIG. 2, and a luminance motion detector 3D and output unit 40 substantially as shown in FIG. 5.

The frame recursive luminance noise reducer 1 removes noise in accordance with a difference between the luminance input signal data Yin and first delayed data (in this embodiment, the one-frame-delayed luminance signal data S2A) and outputs luminance output signal data S1. The frame memory 2A stores the luminance output signal data S1 for one frame interval and outputs one-frame-delayed luminance signal data S2A. The luminance motion detector 3D takes an absolute difference between the luminance output signal data S1 and the one-frame-delayed luminance signal data S2A, compares the absolute difference with a luminance motion threshold TH1 and a series of higher thresholds as explained in the fifth embodiment, and outputs a luminance motion coefficient K.

Frame memory 10A stores the color difference input signal data Cin for one frame interval and outputs second delayed data (in this embodiment, the 90° phase-offset color difference signal data S10A). Selector 19 selects either the color difference input signal data Cin or the 90° phase-offset color difference signal data S10A in accordance with the luminance motion coefficient K. Frame memory 11A stores the selected data for one frame interval and outputs third delayed data (in this embodiment, 180° phase-offset color difference signal data S11A). The adder 16 adds the color difference input signal data Cin and the 180° phase-offset color difference signal data S11A; the divide-by-two circuit 17 halves the sum and outputs averaged color difference signal data S17.

In the output unit 40, the multiplier 41 multiplies the color difference input signal data Cin by the luminance motion coefficient K to obtain a first product; the multiplier 42 multiplies the averaged color difference signal data S17 by a complementary coefficient (1−K), obtained by subtracting the luminance motion coefficient K from unity, to obtain a second product; the adder 43 adds the first and second products and outputs the sum as color difference output signal data Cout.

The sixth embodiment has the same effects as the second embodiment, with the additional effect that cross-color noise reduction is switched on and off in a series of steps, as in the fifth embodiment, so the transition is smoother than in the second embodiment.

SEVENTH EMBODIMENT

The seventh embodiment is also similar to the fifth embodiment, but is based on the third embodiment instead of the first embodiment, and is used with an NTSC component video signal.

The video signal processor in the seventh embodiment has a frame recursive luminance noise reducer 1, a frame memory 2B, a frame memory 10B, an adder 16, a divide-by-two circuit 17, a frame recursive color difference noise reducer 20, a selector 21, a subtractor 22, an absolute value circuit 23, and a threshold comparator 24 as shown in FIG. 3, and a luminance motion detector 3D, a motion coefficient generator 35, and a output unit 40 substantially as shown in FIG. 5.

The frame recursive luminance noise reducer 1 removes noise in accordance with a difference between the luminance input signal data Yin and first delayed data (in this embodiment, one-frame-delayed luminance signal data S2) and outputs luminance output signal data S1. The frame memory 2B stores the luminance output signal data S1 for one frame interval and outputs one-frame-delayed luminance signal data S2B. The luminance motion detector 3D takes an absolute difference between the luminance output signal data S1 and the one-frame-delayed luminance signal data S2B, compares the absolute difference with a luminance motion threshold TH1 and a series of higher thresholds as explained in the fifth embodiment, and outputs a luminance motion coefficient Ky.

The frame recursive color difference noise reducer 20 removes noise in accordance with a difference between the color difference input signal data Cin and second one-frame-delayed data (in this embodiment, 180° phase-offset color difference signal data S10) and outputs noise-free color difference signal data S20. Selector 21 selects either the color difference input signal data Cin or the noise-free color difference signal data S20 in accordance with the color difference noise reduction decision signal S24. Frame memory 10B stores the data selected by selector 21 for one frame interval and outputs 180° phase-offset color difference signal data S10B.

The subtractor 22 takes the difference between the color difference input signal data Cin and the 180° phase-offset color difference signal data SLOB, and the absolute value circuit 23 obtains the absolute value of the difference. If the absolute difference is greater than a threshold, the threshold comparator 24 sets the color difference noise reduction decision signal S24 to a value indicating that cross-color noise is present. If the absolute difference is smaller than the threshold, the threshold comparator 24 sets the color difference noise reduction decision signal S24 to a value indicating that cross-color noise is absent.

The motion coefficient generator 35 combines the luminance motion coefficient Ky with the color difference noise reduction decision signal S24 to generate a motion coefficient K and complementary coefficient 1−K. In one exemplary scheme, the motion coefficient generator 35 sets the motion coefficient K equal to the luminance motion coefficient (K=Ky) when the color difference noise reduction decision signal S24 indicates that cross-color noise is present, and sets the motion coefficient K to unity (K=1) when the color difference noise reduction decision signal S24 indicates that cross-color noise is absent.

The adder 16 adds the color difference input signal data Cin and the 180° phase-offset color difference signal data SLOB, and the divide-by-two circuit 17 halves the sum and outputs averaged color difference signal data S17 to the output unit 40.

In the output unit 40, multiplier 41 multiplies the noise-free color difference signal data S20 by the motion coefficient K to obtain a first product; multiplier 42 multiplies the averaged color difference signal data S17 by the complementary coefficient 1−K to obtain a second product; the adder 43 adds the first and second products and outputs the sum as a color difference signal Cout.

The seventh embodiment has the same effects as the third embodiment, with the additional effect that when cross-color noise is present, cross-color noise reduction is switched on and off in a series of steps according to the amount of luminance motion detected, so the transition is smoother than in the third embodiment.

Variations

Possible modifications of the preceding embodiments include, but are not limited to, the following (1) to (6).

(1) In the first embodiment, frame memories 10 and 11 may each be furnished with an input formatter and an output reformatter. The formatters and reformatters control the writing and reading of data according to a PAL-NTSC selection signal PN so that the output is delayed by one frame for NTSC or two frames for PAL. The same circuit can then be used for processing both NTSC and PAL signals. Similar formatters and reformatters can be added to the third and fourth embodiments. A formatter and reformatter for frame memory 10B in FIG. 3 enable the third embodiment to be used with a PAL signal. In FIG. 4, frame memories 10C-1 and 10C-2 and selectors 25-1 and 25-2 can be combined into a single frame memory with a formatter and reformatter. Frame memories 11C-1 and 11C-2 and selectors 19C-1 and 19C-2 can be combined into another single frame memory with another formatter and reformatter. A similar modification of the second embodiment is possible.

(2) In any of the first to fourth embodiments, frame memories having the same capacity can be used for both NTSC and PAL signals if the signals are sampled so that the data ratios are Y:Cb:Cr=4:2:2 for NTSC and Y:Cb:Cr=4:1:1 for PAL. This sampling scheme permits total frame memory capacity to be reduced.

(3) The luminance motion detector 3 in any of the first to fourth embodiments can be equipped with input filters such as LPFs for its noise-free luminance input (S1) and one-frame-delayed luminance input (S2, S2A, or S2B). These filters are spatial filters operating on the data in one frame by combining vertically or horizontally adjacent data, or data adjacent in both directions, to reduce the effects of noise and jitter.

(4) When the luminance input signal Yin includes little or no noise, such as in the vertical blanking interval, the frame recursive luminance noise reducer 1 of the first or second embodiment may stop operating and pass the luminance input signal Yin through without alteration. If the luminance input signal Yin always includes little or no noise, as in a digital versatile disc (DVD) player, for example, the frame recursive luminance noise reducer 1 may be eliminated to reduce the size of the circuit.

(5) The color difference input signal Cin and the 0° phase-offset color difference signal data S11 may be spatially filtered by LPFs or another type of filter before input to the subtractor 12 in the first embodiment to reduce the effects of noise and jitter by combining vertically or horizontally adjacent data, or data adjacent in both directions, in the same frame.

(6) The fourth embodiment illustrated in FIG. 4 shows one possible combination of the first, second, and third embodiments. The combined features include improved motion detection by in-phase color difference comparison, PAL signal processing with storage of only one luminance signal frame, and improved noise reduction by switching between cross-color noise reduction and frame recursive color difference noise reduction. Other combinations of the first to third embodiments are possible without altering these independent effects.

Possible uses of the invented video signal processor include, but are not limited to, (A) to (C) below.

(A) In video display apparatus such as a television set, the input signals may be obtained by two-dimensional Y/C separation of a composite video signal followed by conversion of the separated signals to demodulated component video signals, or by reproduction of demodulated component video signals that have been obtained in this way and then recorded on recording media. In either case, the invention provides an easy way to display a video image with reduced noise, including reduced cross-color noise.

(B) Similarly, in video recording apparatus such as a video tape recorder (VTR), video cassette recorder (VCR), DVD recorder, or hard disk drive (HDD) recorder, the input signals may be obtained by two-dimensional Y/C separation of a composite video signal followed by conversion of the separated signals to demodulated component video signals, or by reproduction of demodulated component video signals that have been obtained in this way and then recorded on recording media. In either case, the invention provides an easy way to record a video image with reduced noise, including reduced cross-color noise.

(C) In a video reproducing apparatus, noise such as cross-color noise included in a video signal recorded as a component signal can be easily reduced when a video image is output.

Those skilled in the art will recognize that further variations are possible within the scope of the invention, which is defined in the appended claims.

What is claimed is:

1. A video signal processor that receives luminance input signal data and color difference input signal data as consecutive frames of video data and generates luminance output signal data and color difference output signal data, comprising:
   a first video data memory that receives the luminance output signal data, stores the received data for one frame interval, and outputs the stored data as the first delayed data;
   a luminance motion detector that takes a first absolute difference between the luminance output signal data and the first delayed data, compares the first absolute difference with at least one luminance difference threshold, and outputs a luminance motion signal indicating a result of the comparison; and
   a cross-color rejection section that stores the color difference input signal data for at least one frame interval to obtain delayed color difference data, takes an average of the color difference input signal data and the delayed color difference data to obtain averaged color difference data, and combines the color difference input signal data and the averaged color difference data according to at least the luminance motion signal to obtain the color difference output signal data.

2. The video signal processor of claim 1, further comprising a frame recursive luminance noise reducer that takes an algebraic difference between the luminance input signal data and the first delayed data and removes noise from the luminance input signal data according to the algebraic difference, thereby generating the luminance output signal data.

3. The video signal processor of claim 2 wherein, when the algebraic difference has an absolute value less than a predetermined threshold, the frame recursive luminance noise reducer outputs the luminance input signal data without alteration as the luminance output signal data.

4. The video signal processor of claim 1, wherein the cross-color rejection section comprises:
   a second video data memory that receives the color difference input signal data, stores the color difference input signal data for a predetermined number of frames, and outputs the stored data as second delayed data;
   a third video data memory that receives the second delayed data, stores the second delayed data for the predetermined number of frames, and outputs the stored data as third delayed data;
   a zero-phase comparison motion detector that takes a second absolute difference between the color difference input signal data and the third delayed data, compares the second absolute difference with at least one color difference threshold, and outputs a color difference motion signal indicating a result of the comparison;
   a detection signal combiner that receives and combines the luminance motion signal and the color difference motion signal and outputs a combined motion detection signal;
   an averager that adds the second delayed data to the color difference input signal data and divides by two to generate the averaged color difference data; and
   an output unit that combines the color difference input signal data and the averaged color difference data according to the combined motion detection signal, and outputs the combined data as the color difference output signal data.

5. The video signal processor of claim 4, wherein the predetermined number of frames is one frame.

6. The video signal processor of claim 4, wherein the predetermined number of frames is two frames.

7. The video signal processor of claim 4, wherein the detection signal combiner sets the combined motion detection signal to a first value, causing the output unit to select the averaged color difference data as the color difference output signal data, when the luminance motion signal and the color difference motion signal both indicate that motion is absent, and sets the combined motion detection signal to a second value, causing the output unit to select the color difference input signal data as the color difference output signal data, when either one of the luminance motion signal and the color difference motion signal indicates that motion is present.

8. The video signal processor of claim 4, wherein the luminance motion signal, the color difference motion signal, and the combined motion detection signal are coefficients representing respective degrees of motion, and the output unit combines the color difference input signal data and the averaged color difference data in a ratio according to the degree of motion represented by the combined motion detection signal.

9. The video signal processor of claim 8, wherein the detection signal combiner selects whichever one of the luminance motion signal and the color difference motion signal represents greater motion as the combined motion detection signal.

10. The video signal processor of claim 1, wherein the cross-color rejection section comprises:
    a second video data memory that receives the color difference input signal data, stores the color difference input signal data for one frame, and outputs the stored data as second delayed data;
    a selector that selects either the color difference input signal data or the second delayed data according to the luminance motion signal and outputs the selected data;
    a third video data memory that receives the data selected by the first selector, stores the received data for one frame, and outputs the stored data as third delayed data;
    an averager that adds the third delayed data to the color difference input signal data and divides by two to generate the averaged color difference data; and
    an output unit that combines the color difference input signal data and the averaged color difference data according to the luminance motion signal, and outputs the combined data as the color difference output signal data.

11. The video signal processor of claim 10, wherein the output unit selects the averaged color difference data as the color difference output signal data when the luminance motion signal indicates that motion is absent, and selects the color difference input signal data as the color difference output signal data when the luminance motion signal indicates that motion is present.

12. The video signal processor of claim 10, wherein the luminance motion signal is a coefficient representing different degrees of motion, and the output unit combines the color difference input signal data and the averaged color difference data in a ratio according to the degree of motion represented by the luminance motion signal.

13. The video signal processor of claim 1, wherein the cross-color rejection section comprises:
   a frame recursive color difference noise reducer that takes an algebraic difference between the color difference input signal data and second delayed data and removes noise from the color difference input signal data according to the algebraic difference, thereby generating noise-reduced color difference data;
   a selector that selects the color difference input signal data or the noise-reduced color difference data according to a color difference noise reduction decision signal;
   a second video data memory that receives the data selected by the selector, stores the received data for one frame, and outputs the stored data as the second delayed data;
   a color difference noise reduction decision unit that takes a second absolute difference between the color difference input signal data and the second delayed data, compares the second absolute difference with a predetermined threshold, and outputs the color difference noise reduction decision signal, giving the color difference noise reduction decision signal a first value, causing the selector to select the color difference input signal data, when the second absolute value is greater than the predetermined threshold and a second value, causing the selector to select the noise-reduced color difference data, when the second absolute value is less than the predetermined threshold;
   a detection signal combiner that receives and combines the luminance motion signal and the color difference noise reduction decision signal and outputs a combined motion detection signal;
   an averager that adds the second delayed data to the color difference input signal data and divides by two to generate the averaged color difference data; and
   an output unit that combines the noise-reduced color difference data and the averaged color difference data according to the combined motion detection signal, and outputs the combined data as the color difference output signal data.

14. The video signal processor of claim 13 wherein, when the algebraic difference has an absolute value less than a predetermined threshold, the frame recursive color difference noise reducer outputs the color difference input signal data without alteration as the noise-reduced color difference data.

15. The video signal processor of claim 13, wherein the detection signal combiner sets the combined motion detection signal to a third value, causing the output unit to select the averaged color difference data as the color difference output signal data, when the luminance motion signal indicates that motion is absent and the color difference noise reduction decision signal has the first value, and sets the combined motion detection signal to a fourth value, causing the output unit to select the noise-reduced color difference data as the color difference output signal data, when either the luminance motion signal indicates that motion is present or the color difference noise reduction decision signal has the second value.

16. The video signal processor of claim 13, wherein the luminance motion signal and the combined motion detection signal are coefficients representing respective degrees of motion, and the output unit combines the color difference input signal data and the averaged color difference data in a ratio according to the degree of motion represented by the combined motion detection signal.

17. The video signal processor of claim 16, wherein the detection signal combiner selects the luminance motion signal as the combined motion detection signal when the color difference noise reduction decision signal has the first value, and sets the combined motion detection signal to a value causing the output unit to select the noise-reduced color difference data as the color difference output signal data when the color difference noise reduction decision signal has the second value.

18. The video signal processor of claim 1, wherein the cross-color rejection section comprises:
   a frame recursive color difference noise reducer that takes an algebraic difference between the color difference input signal data and second delayed data and removes noise from the color difference input signal data according to the algebraic difference, thereby generating noise-reduced color difference data;
   a first selector that selects the color difference input signal data or the noise-reduced color difference data according to a color difference noise reduction decision signal;
   a second video data memory that receives the data selected by the first selector, stores the received data for one frame, and outputs the stored data as the second delayed data;
   a color difference noise reduction decision unit that takes a second absolute difference between the color difference input signal data and the second delayed data, compares the second absolute difference with a predetermined threshold, and outputs the color difference noise reduction decision signal, giving the color difference noise reduction decision signal a first value, causing the first selector to select the color difference input signal data, when the second absolute value is greater than the predetermined threshold and a second value, causing the first selector to select the noise-reduced color difference data, when the second absolute value is less than the predetermined threshold;
   a second selector that operates according to the luminance motion signal to select the second delayed data or the data selected by the first selector;
   a third video data memory that receives the data selected by the second selector, stores the received data for one frame, and outputs the stored data as third delayed data;
   a third selector that operates according to a video system control signal to select the second delayed data or the third delayed data;
   an averager that adds the data selected by the third selector to the color difference input signal data and divides by two to generate the averaged color difference data;
   a fourth selector that operates according to the luminance motion signal to select the data selected by the first selector or the data selected by the third selector;
   a fourth video data memory that receives the data selected by the fourth selector, stores the received data for one frame, and outputs the stored data as fourth delayed data;
   a fifth selector that operates according to the luminance motion signal to select the data selected by the first selector or the fourth delayed data;
   a fifth video data memory that receives the data selected by the fifth selector, stores the received data for one frame, and outputs the stored data as fifth delayed data;
   a sixth selector that operates according to the video system control signal to select the fourth delayed data or the fifth delayed data;
   a zero-phase comparison motion detector that takes a third absolute difference between the color difference input signal data and the data selected by the sixth selector, compares the third absolute difference with at least one color difference threshold, and outputs a color difference motion signal indicating a result of the comparison;

a detection signal combiner that receives and combines the luminance motion signal, the color difference noise reduction decision signal, and the color difference motion signal and outputs a combined motion detection signal; and an output unit that combines the noise-reduced color difference data and the averaged color difference data according to the combined motion detection signal, and outputs the combined data as the color difference output signal data.

19. The video signal processor of claim 18 wherein, when the algebraic difference has an absolute value less than a predetermined threshold, the frame recursive color difference noise reducer outputs the color difference input signal data without alteration as the noise-reduced color difference data.

20. The video signal processor of claim 18, wherein;

the detection signal combiner sets the combined motion detection signal to a third value, causing the output unit to select the averaged color difference data as the color difference output data, when the luminance motion signal indicates that motion is absent, the color difference noise reduction decision signal has the first value, and the color difference motion signal indicates that motion is absent; and the detection signal combiner sets the combined motion detection signal to a fourth value, causing the output unit to select the noise-reduced color difference data as the color difference output data, when the luminance motion signal indicates that motion is present, the color difference noise reduction decision signal has the second value, or the color difference motion signal indicates that motion is present.

* * * * *